(12) United States Patent
Saito

(10) Patent No.: US 12,522,522 B2
(45) Date of Patent: Jan. 13, 2026

(54) PROCESSING WAFER REGENERATION EQUIPMENT

(71) Applicant: DISCO CORPORATION, Tokyo (JP)

(72) Inventor: Yoshinobu Saito, Tokyo (JP)

(73) Assignee: DISCO CORPORATION, Tokyo (JP)

(*) Notice: Subject to any disclaimer, the term of this patent is extended or adjusted under 35 U.S.C. 154(b) by 537 days.

(21) Appl. No.: 18/047,451

(22) Filed: Oct. 18, 2022

(65) Prior Publication Data

US 2023/0127689 A1 Apr. 27, 2023

(30) Foreign Application Priority Data

Oct. 25, 2021 (JP) ................................ 2021-173823

(51) Int. Cl.
*C02F 1/461* (2023.01)
*C02F 1/469* (2023.01)
(Continued)

(52) U.S. Cl.
CPC .......... *C02F 1/46109* (2013.01); *C02F 11/13* (2019.01); *C02F 2103/04* (2013.01); *C02F 2103/346* (2013.01); *C02F 2201/4618* (2013.01)

(58) Field of Classification Search
CPC .. C02F 1/46109; C02F 11/13; C02F 2103/04; C02F 2103/346; C02F 2201/4618;
(Continued)

(56) References Cited

U.S. PATENT DOCUMENTS

2005/0042165 A1 2/2005 Akiyama et al.
2008/0171244 A1* 7/2008 Okuyama ................ C25B 1/02
205/252
(Continued)

FOREIGN PATENT DOCUMENTS

JP 07000056 A 1/1995
JP 2002307065 A 10/2002
(Continued)

OTHER PUBLICATIONS

Search report issued in counterpart Singapore patent application No. 10202251396A, dated Mar. 22, 2024.
(Continued)

*Primary Examiner* — Pranav N Patel
(74) *Attorney, Agent, or Firm* — Greer, Burns & Crain, Ltd

(57) ABSTRACT

Processing water regeneration equipment includes a waste liquid treatment apparatus that treats waste liquid discharged from a processing apparatus for processing a workpiece by use of processing water, and a fuel cell apparatus that causes a chemical reaction between hydrogen and oxygen to produce electricity and water. The waste liquid treatment apparatus includes a positive electrode and a negative electrode disposed in a tank for reserving the waste liquid, and a hydrogen production unit that supplies electric power to the positive electrode and the negative electrode to produce hydrogen. The fuel cell apparatus causes a chemical reaction between the hydrogen produced by the hydrogen production unit and oxygen in the air to produce electricity and water, and the electricity and water thus produced are utilized in the processing apparatus.

20 Claims, 4 Drawing Sheets

(51) Int. Cl.
*C02F 11/13* (2019.01)
*C02F 103/04* (2006.01)
*C02F 103/34* (2006.01)

(58) Field of Classification Search
CPC .......... C02F 2201/4617; C02F 1/46104; C02F 1/42; C02F 1/4696; C02F 11/12; C02F 1/46176; C02F 1/469; C02F 2201/009; Y02E 60/50; B01D 35/02; C25B 1/04; H01M 8/0631
See application file for complete search history.

(56) References Cited

U.S. PATENT DOCUMENTS

2020/0148570 A1    5/2020   Sugiyama
2020/0270159 A1*   8/2020   Sugiyama ............. F26B 13/103

FOREIGN PATENT DOCUMENTS

| JP | 2004307328 A | 11/2004 |
| JP | 2007335623 A | 12/2007 |
| JP | 2009214193 A | 9/2009 |
| JP | 2013094740 A | 5/2013 |
| JP | 2013119050 A | 6/2013 |
| JP | 2020078783 A | 5/2020 |

OTHER PUBLICATIONS

Japanese Patent Application No. 2021-173823: English translation of Office Action, May 27, 2025 (3 pages).
German Patent Application No. 10 2022 211 013.7: English translation of Office Action, Nov. 24, 2025 (4 pages).

* cited by examiner

PROCESSING WAFER REGENERATION EQUIPMENT

BACKGROUND OF THE INVENTION

Field of the Invention

The present invention relates to processing water regeneration equipment for regenerating processing water.

Description of the Related Art

For example, as disclosed in Japanese Patent Laid-open No. Hei 07-000056, in a plant for processing semiconductor wafers or the like, it is desired to reduce cost of water and energy such as electric power used. In addition, as disclosed in Japanese Patent Laid-open No. 2009-214193, a processing apparatus for processing a workpiece by use of processing water regenerates the processing water from waste liquid containing processing swarf. In other words, the processing water supplied to the processing apparatus is circulated by processing water regeneration equipment to be reused.

Therefore, the waste liquid discharged by the processing apparatus and reserved in a tank is pumped up by a first pump and sent to a filter, where processing swarf is removed, and fresh water deprived of the processing swarf is sent under pressure to an ion exchange resin by a second pump, so that ultrapure water is regenerated. Since the pumps are thus operated, electric power is consumed. In addition, in the beginning of starting circulation, ultrapure water is supplied to the processing apparatus or the like from a plant facility or the like, and thus, water is consumed here, too.

Further, in the case where the processing swarf generated in the processing apparatus is silicon swarf, as disclosed in Japanese Patent Laid-open No. 2013-119050, for example, anode plates and cathode plates are alternately disposed in a tank of waste liquid, a direct current is supplied to the anode plates and the cathode plates to cause deposition of silicon swarf on the anode plates, and the silicon swarf is removed from the waste liquid to regenerate pure water. Since hydrogen is generated when the wet silicon swarf gets dried, a drying chamber for drying the silicon swarf is configured not to be a hermetically sealed chamber, and the hydrogen is released to the atmosphere (see Japanese Patent Laid-open No. 2020-078783, for example).

SUMMARY OF THE INVENTION

As described above, the processing apparatus processes a workpiece by use of processing water. In addition, the processing water regeneration equipment for regenerating the waste liquid discharged from the processing apparatus as processing water needs supply of pure water from the plant and consumes electric power for operating various pumps for feeding the waste liquid or other purposes.

Accordingly, it is an object of the present invention to provide processing water regeneration equipment capable of suppressing the consumption of electric power and the consumption of water supplied by a plant facility or the like.

In accordance with an aspect of the present invention, there is provided processing water regeneration equipment including a waste liquid treatment apparatus that treats waste liquid discharged from a processing apparatus for processing a workpiece by use of processing water, and a fuel cell apparatus that causes a chemical reaction between hydrogen and oxygen to produce electricity and water. The waste liquid treatment apparatus includes a positive electrode and a negative electrode disposed in a tank for reserving the waste liquid, and a hydrogen production unit that supplies electric power to the positive electrode and the negative electrode to produce hydrogen. The fuel cell apparatus causes a chemical reaction between the hydrogen produced by the hydrogen production unit and oxygen in the air to produce electricity and water, and the electricity and water thus produced are utilized in the processing apparatus.

Preferably, the workpiece is made of silicon, the processing apparatus discharges the waste liquid containing silicon swarf obtained by grinding the silicon, and the waste liquid treatment apparatus includes a swarf acquisition unit that takes out the silicon swarf from the waste liquid to acquire the wet silicon swarf and a drying unit that dries the wet silicon swarf. Hydrogen generated when the silicon swarf is dried by the drying unit is supplied to the fuel cell apparatus.

In the processing water regeneration equipment according to the present invention, the fuel cell apparatus can cause a chemical reaction between the hydrogen produced by the hydrogen production unit and the oxygen in the air to produce electricity and water, and the electricity and water thus produced can be utilized in the processing apparatus, so that the consumption of electric power and water can be suppressed.

In addition, the processing apparatus discharges the waste liquid containing the silicon swarf obtained by grinding the silicon, and the waste liquid treatment apparatus includes the drying unit that dries the wet silicon swarf. Therefore, the hydrogen generated when the silicon swarf gets dried can be supplied to the fuel cell apparatus, the hydrogen generated can effectively be utilized, and the consumption of electric power and water can further be suppressed.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
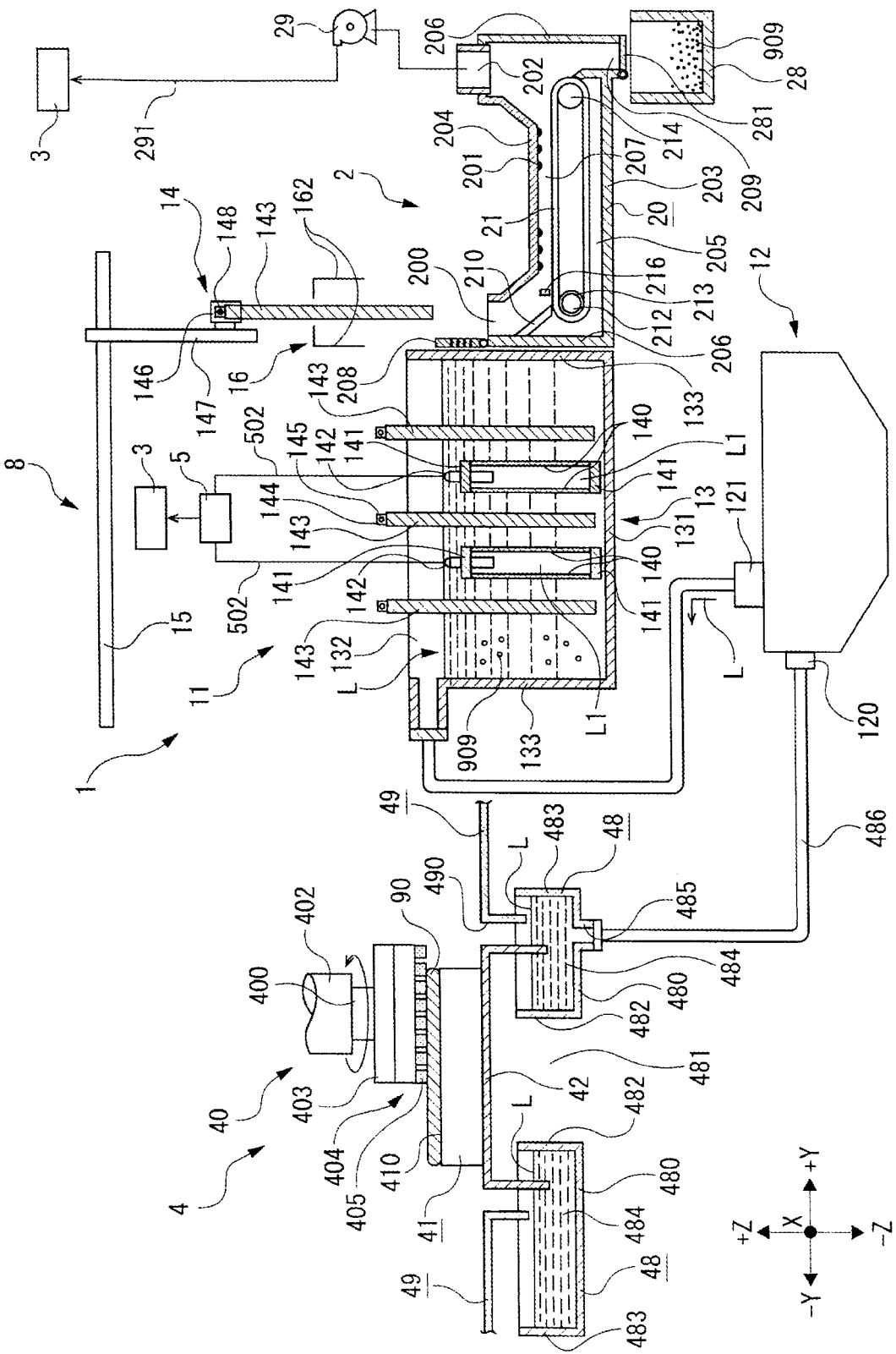
FIG. 1 is a schematic diagram depicting a grinding apparatus, a waste liquid treatment apparatus of processing water regeneration equipment, and a fuel cell apparatus of the processing water regeneration equipment.

A grinding apparatus 4 depicted in FIG. 1, which is one kind of a processing apparatus, includes a holding table 41 that holds a workpiece 90, and a grinding unit 40 that grinds the workpiece 90 by grindstones 405 being rotated. The workpiece 90 is, for example, a silicon wafer but may be a cylindrical silicon ingot. Note that the processing apparatus may be a cutting apparatus that cuts the workpiece 90 by a cutting blade being rotated, a polishing apparatus that polishes the workpiece 90 by a polishing pad, or the like.

The holding table 41 disposed on a base 49 of the grinding apparatus 4 includes, for example, a holding surface 410 which is formed of a porous member or the like and communicates with a suction source not illustrated. The holding table 41 is rotatable with a Z axis as an axis of rotation, and is supported by a table support base 42. The table support base 42 disposed in an opening 490 formed in an upper surface of the base 49 can be moved in an X-axis direction (in the sheet of FIG. 1, a depthwise direction) by an X-axis moving mechanism not illustrated such as a ball screw mechanism.

On each of both sides of a moving path of the holding table 41, a box-like water case part is disposed. While the water case parts are depicted at two positions on left and right sides of the table support base 42, a water case part is formed also at two opposite positions in the depthwise direction with respect to the table support base 42 in the sheet of FIG. 1, and these water case parts are integrated to form a water case 48 having a tub section 484 which is in a rectangular box-like shape in plan view. In other words, the water case 48 has a rectangular opening 481 formed in a central part of a bottom plate 480 of the box-like member in order to permit the holding table 41 to reciprocate in the X-axis direction, and includes the tub section 484 and a liquid discharge port 485. The tub section 484 is constituted by the bottom plate 480, an inside wall 482, and an outside wall 483 to receive processing water, and the liquid discharge port 485 is formed in the bottom plate 480. One end of a delivery pipe 486 extending to the exterior of the water case 48 is connected to the liquid discharge port 485. The water case 48 receives processing water (waste liquid L), which contains powdery swarf 909 (silicon swarf 909) generated upon grinding of the workpiece 90 with use of the grindstones 405 and discharged and which flows down from the holding table 41, and sends the processing water (waste liquid L) to a tank 12 depicted in FIG. 1.

The grinding unit 40 has a grinding wheel 404 mounted to a lower end of a spindle 400, which is rotatable by a motor 402, through a mount 403. The grinding wheel 404 includes an annular wheel base, and the plurality of grindstones 405 that each have a substantially rectangular parallelepiped shape and are arranged in an annular pattern on a lower surface of the wheel base. The grindstones 405 are formed by bonding diamond abrasive grains or the like with an appropriate bonding agent. The grinding unit 40 is movable vertically in the Z-axis direction.

A flow channel, not illustrated, communicating with a processing water supply source and serving as a passage for the processing water is formed inside the spindle 400 in the manner of penetrating the spindle 400 in an axial direction thereof. The flow channel is opened in a bottom surface of the wheel base in such a manner that the processing water can be jetted from the opening toward the grindstones 405. Note that a processing water nozzle may be disposed at a position adjacent to the grinding wheel 404 that is lowered to a position for grinding the workpiece 90, and the processing water may be supplied from the processing water nozzle toward an area where the grindstones 405 and the workpiece 90 make contact.

Processing water regeneration equipment 8 according to the present invention depicted in FIG. 1 includes a waste liquid treatment apparatus 1 that treats the waste liquid L discharged from the grinding apparatus 4 that processes the workpiece 90 by use of the processing water, and a fuel cell apparatus 3 that causes a chemical reaction between hydrogen and oxygen to produce electricity and water.

The waste liquid treatment apparatus 1 depicted in FIG. 1 includes, for example, a swarf acquisition unit 11 that takes silicon swarf 909 out of the waste liquid L to acquire the wet silicon swarf 909. The swarf acquisition unit 11 includes a water tank 13 for reserving the waste liquid L, a take-out mechanism 14 that takes out the silicon swarf 909 containing much water from the water tank 13, and a scraping mechanism 16 that scrapes off the water-containing silicon swarf 909 from an anode plate 143 held by a holding section 146 of the take-out mechanism 14.

For example, the tank 12 for temporarily accommodating the waste liquid L is disposed at a position below the water case 48, and another end of the delivery pipe 486 is connected to the tank 12. The tank 12 is equipped with a delivery pump 121 that pumps up the waste liquid L containing the silicon swarf 909 of the workpiece 90 from the inside of the tank 12, to deliver the waste liquid L to the water tank 13, and the delivery pump 121 delivers the waste liquid L toward an inflow port of the water tank 13 through a delivery pipe.

The water tank 13 in a substantially rectangular parallelepiped box-like shape is formed, for example, of an insulating member such as a synthetic resin and includes a bottom plate 131 rectangular in plan view and four side walls integrally rising in a +Z direction from a periphery of the bottom plate 131, so that the water tank 13 can reserve the waste liquid L containing the silicon swarf 909 of the workpiece 90 in a space surrounded by the bottom plate 131 and the side walls. The two side walls facing each other in the X-axis direction in FIG. 1 are referred to as side walls 132 (only one of which is illustrated), and the two side walls facing each other in a Y-axis direction are referred to as side walls 133. In addition, an overflow pipe not illustrated for preventing overflow of the waste liquid L is provided at an upper part of the water tank 13. The overflow pipe communicates with the tank 12 and guides the waste liquid L, which is to flow over from the water tank 13, again into the tank 12.

The take-out mechanism 14 depicted in FIG. 1 which takes out the water-containing silicon swarf 909 from the waste liquid L in the water tank 13 includes, for example, cathode plates 140 which are disposed in the water tank 13 and are to be negatively charged; anode plates 143 which are disposed to face the cathode plates 140, can be put into and out of the water tank 13, and are to be positively charged to have the water-containing silicon swarf 909 adsorbed thereon; the holding section 146 that holds one of the anode plates 143; and a vertical moving section 147 for vertically moving the holding section 146.

The anode plates 143 are formed of a material which is electrochemically noble, and are formed into a rectangular shape in plan view. For example, the anode plates 143 can be formed of such a material as copper, silver, platinum, or gold, and stainless steel is adopted in the present embodiment. The silicon swarf 909 mainly adheres to each anode plate 143 at one surface, which is a side surface in the Y-axis direction, and at another surface on a side opposite to the one surface.

For example, inner surfaces of the two side walls 132 (only one of which is illustrated) facing each other in the X-axis direction of the water tank 13 depicted in FIG. 1 are formed with a plurality of support grooves which are not illustrated, and the anode plates 143 are disposed inside the water tank 13 in the state of being inserted in the support grooves at predetermined intervals in the Y-axis direction. In other words, the plurality of anode plates 143 are disposed at intervals therebetween in a state in which both side surfaces thereof are orthogonal to a longitudinal direction of the water tank 13 (Y-axis direction) and parallel to a widthwise direction of the water tank 13 (X-axis direction).

At a top end surface of each of the anode plates 143, for example, two engaged sections 144 (only one of which is illustrated) projecting upward in such a manner as to be spaced from each other across a central part in the widthwise direction (X-axis direction) are provided. The engaged sections 144 are each formed into a rectangular plate shape, and an engaged hole 145 penetrating the engaged section 144 in the X-axis direction is provided in the center thereof. An engaging pin 148 of the holding section 146 depicted in FIG. 1 enters the engaged hole 145 to be engaged with the engaged hole 145.

The cathode plates 140 depicted in FIG. 1 are each provided between adjacent ones of the anode plates 143. In other words, the cathode plates 140 face the anode plates 143 in the Y-axis direction, and the cathode plates 140 and the anode plates 143 are disposed alternately in such a manner as to be spaced from each other and be parallel to each other.

Figure 3:
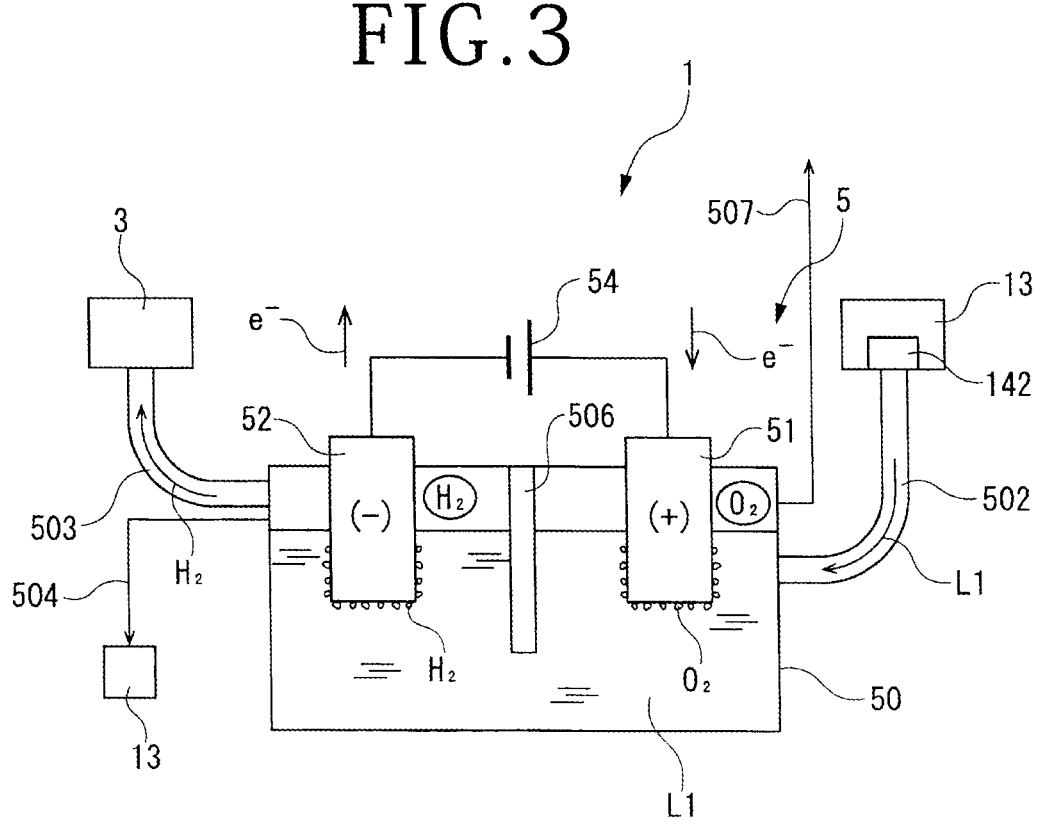
FIG. 3 is a schematic diagram depicting a hydrogen production unit.

As depicted in FIG. 1, each of the cathode plates 140 is supported, for example, by a frame 141 rectangular in side view (Y-axis direction), and a discharge section 142 is formed at an upper part of the frame 141. The discharge section 142 is connected, for example, to a pipe 502 for discharging after-swarf-removal waste liquid L1 which has been deprived of the silicon swarf 909 and which has entered an inside space of the frame 141 and for delivering it to a hydrogen production unit 5. The hydrogen production unit 5, a specific configuration of which is depicted in FIG. 3, includes a tank 50, and a positive electrode 51 and a negative electrode 52 which are disposed in the tank 50. As depicted in FIG. 1, the cathode plate 140 has a pair of plate parts disposed in parallel to each other while being spaced from each other in such a manner as to close openings on both sides of the frame 141.

Note that the cathode plate 140 may be a flat plate, and the discharge section 142 may be disposed at the cathode plate 140. Alternatively, since it is sufficient if the tank 50 can reserve the after-swarf-removal waste liquid L1, swarf removal may be carried out by using a filter or by causing precipitation of swarf.

As with the anode plates 143, each of the plate parts of the cathode plate 140 is formed of a material which is electrochemically noble, and is formed into a rectangular flat plate-like shape in plan view. For example, each plate part can be made of a material such as copper, silver, platinum, or gold. In the present embodiment, stainless steel is adopted. Each plate part is, for example, a mesh plate, and the mesh does not catch the silicon swarf 909. Each plate part is adapted to be negatively charged to thereby generate a repulsive force against the silicon swarf 909. In other words, when each cathode plate 140 is negatively charged, only the after-swarf-removal waste liquid L1 as liquid of the waste liquid L is allowed to pass through the cathode plate 140, and a repulsive force is generated between the silicon swarf 909 negatively charged and the cathode plate 140, so that the passage of the silicon swarf 909 is restricted. Accordingly, the after-swarf-removal waste liquid L1 having passed through the cathode plate 140 is stored in the inside space defined by the frame 141 and the cathode plate 140. Since a repulsive force is generated between the silicon swarf 909 and the cathode plate 140, the inside space of the frame 141 in which the after-swarf-removal waste liquid L1 is stored is isolated from the waste liquid L in the water tank 13.

A gap having a predetermined width is defined between a lower end of each cathode plate 140 and the bottom plate 131 of the water tank 13, and a gap having a predetermined width is defined between a lower end of each anode plate 143 and the bottom plate 131 of the water tank 13. Accordingly, the waste liquid L having entered the water tank 13 passes through the gaps and rises in the spaces between the cathode plates 140 and the anode plates 143.

Figure 2:
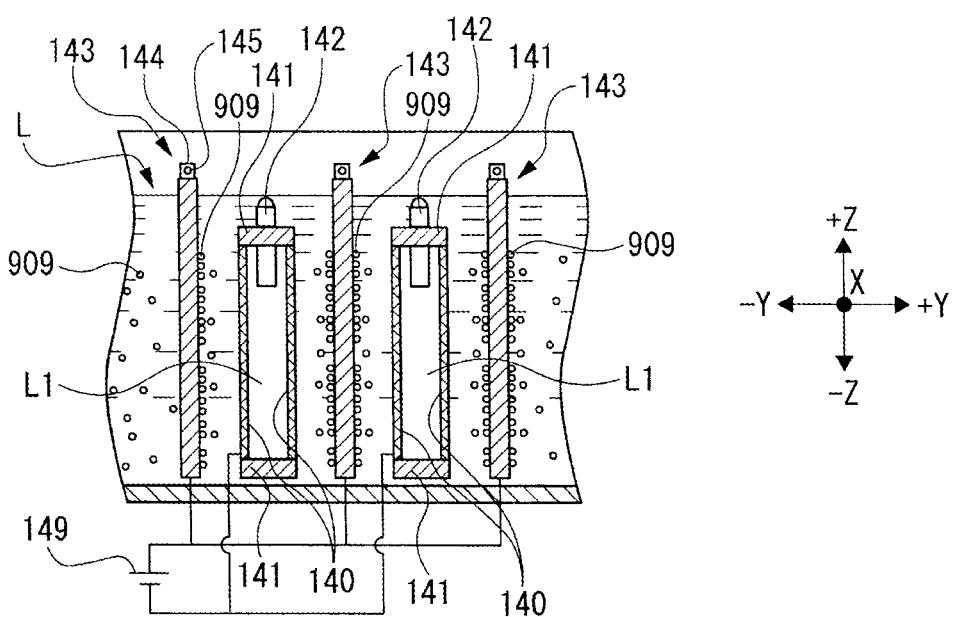
FIG. 2 is a sectional view depicting, in an enlarged form, disposition of anode plates and cathode plates in a water tank.

In the present embodiment, a direct-current voltage is applied between the anode plates 143 and the cathode plates 140. As depicted in FIG. 2, the positive (+) side of a direct-current power source 149 is connected to the anode plates 143, so that the anode plates 143 are positively charged in the waste liquid L, and the silicon swarf 909 negatively charged in the waste liquid L is adsorbed on the anode plates 143. Meanwhile, the negative (−) side of the direct-current power source 149 is connected to the cathode plates 140, so that the cathode plates 140 are negatively charged in the waste liquid L, and an electric field is formed between each anode plate 143 and each cathode plate 140. Owing to electrophoresis, the silicon swarf 909 which is mixed in the waste liquid L and is negatively charged receives a repulsive force from the cathode plates 140 negatively charged and is adsorbed on the anode plates 143 positively charged.

The vertical moving section 147, depicted in FIG. 1, which moves the holding section 146 holding an upper part of each anode plate 143 up and down to take the anode plate 143 out of the water tank 13 or put the anode plate 143 into the water tank 13 can reciprocate above the water tank 13 horizontally in the Y-axis direction with use of the Y-axis moving unit 15 such as an electric slider.

The waste liquid treatment apparatus 1 in the present embodiment includes a drying unit 2 depicted in FIG. 1 for drying the wet silicon swarf 909. The Y-axis moving unit 15 has a length ranging from the upper side of the water tank 13 to the upper side of the drying unit 2 and, by moving the vertical moving section 147 and the holding section 146 in the Y-axis direction, can move the anode plates 143 held by the holding section 146 from the water tank 13 to the upper side of the drying unit 2.

The vertical moving section 147 is configured in such a manner that the slider is guided by guide rails to move in the Z-axis direction, and the holding section 146 is attached to a side surface of the slider. The holding section 146 that holds each anode plate 143 is, for example, a pair of chuck cylinders disposed on side surfaces of the vertical moving section 147. The pair of chuck cylinders constituting the holding section 146 face each other with a predetermined interval therebetween in the widthwise direction of the water tank 13 (X-axis direction). In other words, the holding section 146 includes a pair of cylinder bodies attached to the slider of the vertical moving section 147, and engaging pins 148 provided to be projectable and retractable from and into the respective cylinder bodies in the widthwise direction of the water tank 13 (X-axis direction). In the holding section 146, for example, the engaging pins 148 projecting from the respective cylinder bodies act to approach each other in the X-axis direction. When the engaging pins 148 project from the respective cylinder bodies in a state in which the holding section 146 lowered by the vertical moving section 147 is positioned above one anode plate 143, the engaging pins 148 are inserted and fitted into the respective engaged holes 145 of the engaged sections 144 of the anode plate 143. As a result, a state in which the holding section 146 holds the anode plate 143 is established. Note that, in FIG. 1, only one of the pair of chuck cylinders constituting the holding section 146 is illustrated.

The scraping mechanism 16 sandwiches, from both sides in the Y-axis direction, the anode plate 143 taken out of the water tank 13 by the holding section 146 to scrape off the adhering silicon swarf 909 is disposed in the vicinity of the upper side of an intake port 200 provided on one end side (−Y direction side) of a drying box 20 of the drying unit 2. The scraping mechanism 16 includes a pair of scraping plates 162 which can be moved in the Y-axis direction by an open-close cylinder or the like, and the scraping plates 162 extend in the X-axis direction longer than a width (length in the X-axis direction) of the anode plate 143.

In the state in which the scraping plates 162 sandwich surfaces of the anode plate 143, for example, the holding section 146 holding the anode plate 143 is raised, so that the scraping plates 162 can scrape off the silicon swarf 909 which contains much water and is adsorbed on the anode plate 143 from the anode plate 143.

For example, at a position adjacent to the water tank 13, the drying unit 2 for removing water from the silicon swarf 909 depicted in FIG. 1 is disposed, and a conveying belt 21 on which the water-containing silicon swarf 909 scraped off from the anode plate 143 is placed and which conveys the silicon swarf 909 to a recovery box 28 is disposed in such a manner as to extend in the Y-axis direction inside the drying box 20 constituting the drying unit 2.

The drying box 20 has, for example, a substantially rectangular parallelepiped outer shape in plan view and includes, for example, a rectangular bottom plate 203, four side walls integrally rising up from a periphery of the bottom plate 203 in the +Z direction, and a top plate 204 which is connected to upper ends of the side walls and faces an upper surface of the conveying belt 21. The two side walls (only one on the depth side in the sheet of FIG. 1 is illustrated) facing each other in the X-axis direction in FIG. 1 are referred to as side walls 205, and the two side walls facing each other in the Y-axis direction are referred to as side walls 206. An inside space of the drying box 20 is a gas passage 207 through which gas flows in a conveying direction of the silicon swarf 909 (+Y direction).

On one end side (−Y direction side) of the top plate 204, the intake port 200 is formed penetrating the top plate 204 in its thickness direction, and the water-containing silicon swarf 909 which has been scraped off from the anode plate 143 and has dropped enters the drying box 20 through the intake port 200. On the upper side of the intake port 200, a lid 208 which is openable and closable and is formed with lid intake ports is disposed.

For example, on the lower side of the intake port 200, a guide plate 210 inclined in such a manner as to guide the water-containing silicon swarf 909 scraped off and dropped onto the conveying belt 21 is disposed. The conveying belt 21 which is an endless belt can be moved rotationally by a motor 212. The motor 212 is fixed to one side wall 205, a driving roller 213 is attached to a shaft of the motor 212, and the conveying belt 21 is wrapped on the driving roller 213. A driven roller 214 is disposed at a position spaced by a predetermined distance from the driving roller 213 in the +Y direction, and the conveying belt 21 is wrapped also on the driven roller 214. When the motor 212 is operated to rotate the driving roller 213, the conveying belt 21 is moved rotationally attendant on the rotation of the driving roller 213 and the driven roller 214.

The drying box 20 is provided, for example, with a squeegee 216 that spreads the water-containing silicon swarf 909, which has been placed on the conveying belt 21, on the conveying belt 21 to flatten the silicon swarf 909 into a predetermined thickness. Both ends in the X-axis direction of the squeegee 216 are fixed, for example, to the side walls 205. Note that a pressing roller may be disposed in place of the squeegee 216.

In addition, on another end side (+Y direction side) of the top plate 204, an exhaust port 202 for discharging gas to the exterior of the drying box 20 is formed penetrating the top plate 204. A suction port of a blower fan 29 is made to communicate with the exhaust port 202 through an exhaust pipe. One end of a pipe 291 is connected to a discharge port of the blower fan 29, and the fuel cell apparatus 3 communicates with another end side of the pipe 291. In other words, in the processing water regeneration equipment 8 in the present embodiment, hydrogen generated when the silicon swarf 909 is dried by the drying unit 2 is supplied to the fuel cell apparatus 3.

On the other end side (+Y direction side) of the bottom plate 203, a discharge port 209 is formed penetrating the bottom plate 203 in its thickness direction, and the conveying belt 21 drops the dried silicon swarf 909 into the discharge port 209. A lid 281 which can be opened and closed is disposed on the lower side of the discharge port 209.

The recovery box 28 is disposed on the lower side of the other end (an end on the +Y direction side) of the drying box 20 and is opened directly below the discharge port 209. At an upper part of the recovery box 28, for example, a sensor (transmission-type optical sensor, for example) not illustrated is disposed and detects that the recovery box 28 has become fully filled with the silicon swarf 909.

As depicted in FIG. 1, a lower surface of the top plate 204 may be formed with a plurality of projections 201. The projections 201 each have, for example, a hemispheric outer shape, but this is not limitative, and may each have a cylindrical or prismatic outer shape. The plurality of projections 201 are, for example, disposed on the lower surface of the top plate 204 at predetermined regular intervals in the X-axis direction and the Y-axis direction, but may be disposed at random positions on the lower surface of the top plate 204. In addition, where the projections 201 are cylindrical or prismatic in outer shape, they may extend in the X-axis direction and be disposed at predetermined regular intervals in the Y-axis direction.

The gas flowing in the conveying direction through the gas passage 207 inside the drying box 20 strikes the projections 201 formed on the lower surface of the top plate 204 to thereby produce turbulence. In other words, an irregular vortex of the gas is produced above the conveying belt 21, and the gas flows in the conveying direction. As a result, the turbulence is blown against the wet silicon swarf 909 on the conveying belt 21, thereby facilitating the evaporation of water from the silicon swarf 909. Note that the projections 201 may not be formed on the lower surface of the top plate 204. Note that, for example, the drying of the silicon swarf 909 may be carried out by blowing hot air from a heater against the silicon swarf 909 on the conveying belt 21, or may be carried out by disposing a heater inside the conveying belt 21 and conducting heat from the conveying belt 21 to the silicon swarf 909.

The waste liquid treatment apparatus 1 has the hydrogen production unit 5 that includes the positive electrode 51 and the negative electrode 52 disposed in the tank 50 for reserving the waste liquid (in the present embodiment, the after-swarf-removal waste liquid L1), and that produces hydrogen by supplying electric power to the positive electrode 51 and the negative electrode 52. As depicted in FIGS. 1 and 3, in the present embodiment, for example, the tank 50 communicates with the discharge section 142 of the frame 141 supporting each cathode plate 140 through the pipe 502 or the like.

Note that an overflow pipe 504 is disposed in the tank 50, and the after-swarf-removal waste liquid L1 overflowing from the tank 50 is returned to the water tank 13. For collecting hydrogen ($H_2$) generated in the after-swarf-removal waste liquid L1 in the tank 50 as hydrogen gas in an upper part of the inside of the tank 50, and thus, for forming a predetermined space in the upper part of the inside of the tank 50, the overflow pipe 504 is disposed in such a manner as to prevent the water level of the after-swarf-removal waste liquid L1 in the tank 50 from rising to or above a predetermined height. In addition, a partition plate 506 for preventing oxygen ($O_2$) generated on the positive electrode 51 and hydrogen generated on the negative electrode 52 from being mixed with each other is disposed in the tank 50 between the positive electrode 51 and the negative electrode 52. Further, an oxygen exhaust pipe 507 for releasing the oxygen generated on the positive electrode 51 to the atmosphere communicates with an upper part side of the tank 50.

Note that the oxygen exhaust pipe 507 may be connected to the fuel cell apparatus 3. A direct-current power source 54 is connected to the positive electrode 51 (anode 51) and the negative electrode 52 (cathode 52) each formed of metal or a carbon rod, which is electrically noble, disposed in the tank 50.

Figure 4:
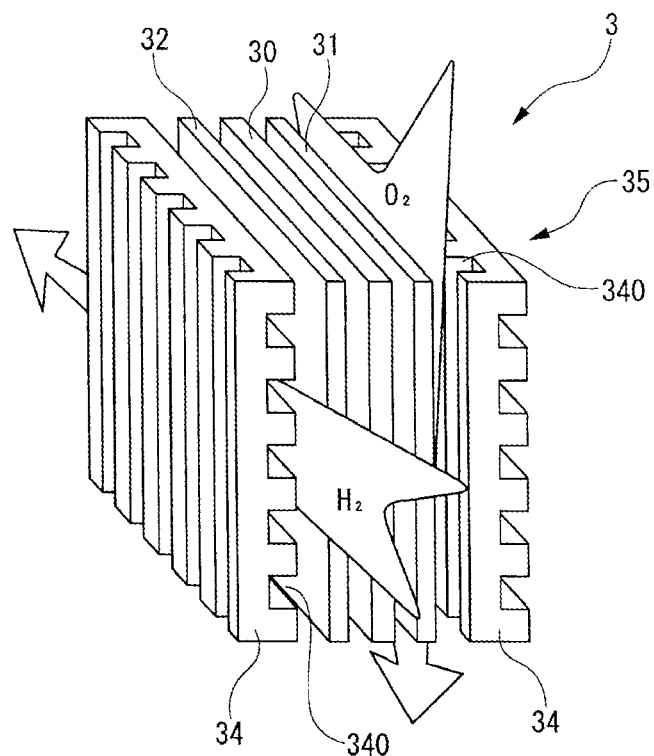
FIG. 4 is a perspective view depicting an example of the fuel cell apparatus.
Figure 5:
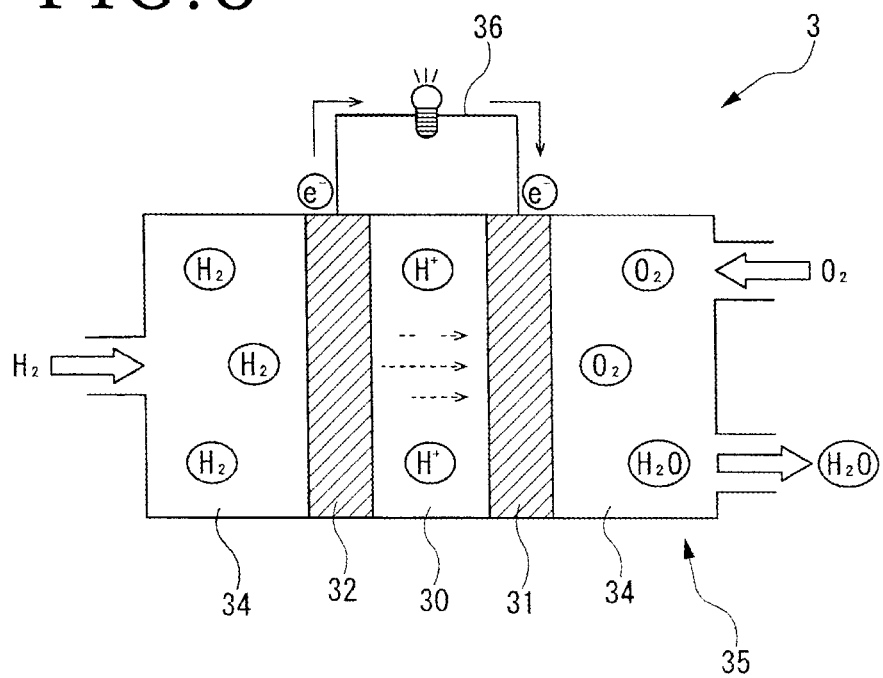
FIG. 5 is a schematic diagram for explaining a chemical reaction in the fuel cell apparatus.

One end of an exhaust pipe 503 communicates with an upper part side of the tank 50, and, for example, the hydrogen ($H_2$) generated on the negative electrode 52 side inside the tank 50 is sent through the exhaust pipe 503 toward the fuel cell apparatus 3 communicating with another end side of the exhaust pipe 503. For example, the hydrogen production unit 5 depicted in FIG. 3 is installed underground of a plant in which the water tank 13 and the drying unit 2 depicted in FIG. 1 are installed. In addition, the fuel cell apparatus 3 described later and depicted in FIGS. 4 and 5 is installed, for example, on a roof floor of the plant. Since the hydrogen generated in the hydrogen production unit 5 is lighter than air, the hydrogen is transported as gas to the fuel cell apparatus 3 on the roof floor. Note that the fuel cell apparatus 3 preferably is disposed at a position higher than the hydrogen production unit 5, but this is not limitative.

The fuel cell apparatus 3 depicted in FIGS. 4 and 5 includes at its center an electrolyte film 30 formed of a solid polymer film or the like. The electrolyte film 30 is sandwiched by an oxygen electrode 31 which is a positive electrode plate and a hydrogen electrode 32 which is a negative electrode plate, and the resulting assembly is further sandwiched from outside by separators 34 which are carbon separators, metallic separators, or the like including a plurality of ventilation grooves 340, to thereby obtain one cell 35. The fuel cell apparatus 3 is disposed in the processing water regeneration equipment 8 as a fuel cell stack obtained by stacking a plurality of the cells 35 to form one package.

The exhaust pipe 503 of the hydrogen production unit 5 depicted in FIG. 3 and the pipe 291 connected to the blower fan 29 depicted in FIG. 1 communicate with the ventilation grooves 340 of the separator 34 on the side of the hydrogen electrode 32 depicted in FIG. 4, and the hydrogen generated through electrolysis of the after-swarf-removal waste liquid L1 in the tank 50 and the hydrogen generated when the silicon swarf 909 is dried in the drying box 20 flow thereto. In addition, the ventilation grooves 340 of the separator 34 on the side of the oxygen electrode 31 are, for example, opened to the atmosphere, and oxygen ($O_2$) in the air flows therein.

Described hereinbelow is operation of the waste liquid treatment apparatus 1 in the case where the workpiece 90 which is a silicon wafer is ground by the grindstones 405 while supplying processing water by use of the grinding apparatus 4 depicted in FIG. 1, and the silicon swarf 909 containing much water is recovered from the discharged waste liquid L containing the silicon swarf 909 of the workpiece 90. In addition, a step carried out in the processing water regeneration equipment 8, in which the fuel cell apparatus 3 causes a chemical reaction between the hydrogen generated in the hydrogen production unit 5 and the oxygen in the air to produce electricity and water, which are utilized in the grinding apparatus 4, will be described.

First, the workpiece 90 is held under suction on the holding surface 410 of the holding table 41 and is then put into a state of being positioned at a grinding position facing the grindstones 405. The grinding unit 40 is progressively lowered, and the grindstones 405 being rotated make contact with an upper surface of the workpiece 90, so that grinding is conducted. In addition, the holding table 41 is rotated at a predetermined rotational speed, and hence, the workpiece 90 is also rotated, so that the grindstones 405 grind the whole area of the upper surface of the workpiece 90. During grinding, processing water is supplied to the contact area of the grindstones 405 and the upper surface of the workpiece 90, so that the contact area is cooled and cleaned.

By the grinding, the workpiece 90 is ground, and as a result, fine powdery silicon swarf 909 is generated, and the silicon swarf 909 is mixed into the processing water to generate the waste liquid L. The thus generated waste liquid L flows through the opening 490 into the water case 48, and thereafter flows through the delivery pipe 486 and the tank 12 into the water tank 13, to be reserved therein. The silicon swarf 909 of the workpiece 90 absorbs the processing water to become the wet silicon swarf 909.

In the state in which the waste liquid L is thus reserved in the water tank 13, the anode plates 143 and the cathode plates 140 are immersed in the waste liquid L, and then the positive (+) side of the direct-current power source 149 is connected to the anode plates 143 while the negative (−) side of the direct-current power source 149 is connected to the cathode plates 140. As a result, an electric field is formed between each anode plate 143 and each cathode plate 140. Then, owing to electrophoresis, the silicon swarf 909 which is mixed in the waste liquid L and is negatively charged (−) receives a repulsive force from the cathode plates 140 negatively charged (−) and is adsorbed on the anode plates 143 positively charged (+).

After a predetermined amount of the silicon swarf 909 is adsorbed on the anode plates 143, the Y-axis moving unit 15 moves the holding section 146 to a position above one anode plate 143. Next, the holding section 146 is lowered to hold the anode plate 143, and pulls up the anode plate 143 from the waste liquid L in the water tank 13. Subsequently, the holding section 146 holding the anode plate 143 is moved to a position above the intake port 200 of the drying box 20.

Thereafter, the pair of scraping plates 162 of the scraping mechanism 16 are horizontally moved, and the anode plate 143 is sandwiched by the scraping plates 162. From this state, the holding section 146 is raised to pull up the anode plate 143, so that the wet silicon swarf 909 is scraped off from the anode plate 143, drops through the intake port 200 of the drying box 20 onto the guide plate 210 in the drying box 20, and is further moved onto the conveying belt 21.

Next, for example, the intake port 200 is placed into a state of being closed with the lid 208. In addition, the motor 212 is driven to rotationally move the conveying belt 21, to thereby convey the silicon swarf 909 from the −Y direction side toward the +Y direction side. Since the squeegee 216 is disposed on the upper side of the conveying belt 21, when the water-containing silicon swarf 909 on the conveying belt 21 passes on the lower side of the squeegee 216, the silicon swarf 909 is spread to be flattened into a predetermined thickness (for example, 1 to 2 mm) on the conveying belt 21.

The wet silicon swarf 909 is conveyed by the conveying belt 21, and at the same time, the blower fan 29 disposed outside the drying box 20 is driven to suck the air in the drying box 20 through the exhaust port 202. As a result, outside air (air) is taken in through the lid intake ports of the lid 208 and the intake port 200 into the drying box 20, and the air flows through the gas passage 207 in the conveying direction (from the −Y direction toward the +Y direction). As a result, water is evaporated from the silicon swarf 909 on the conveying belt 21, and the silicon swarf 909 gets dried. In addition, concurrently with the drying of the silicon swarf 909, hydrogen is generated. The hydrogen generated in the drying box 20 is sent through the pipe 291 to the fuel cell apparatus 3 by the blower fan 29. Note that air on the negative electrode 52 side with respect to the partition plate 506 at an upper part in the tank 50 depicted in FIG. 3 and air in the exhaust pipe 503 are replaced by hydrogen.

By the removal of water from the silicon swarf 909 as above, only the dried silicon swarf 909 is left on the conveying belt 21. When the dried silicon swarf 909 on the conveying belt 21 is conveyed beyond the driven roller 214, the silicon swarf 909 drops into the recovery box 28. By the weight of the dried silicon swarf 909, the lid 281 is opened, and the dried silicon swarf 909 is recovered into the recovery box 28.

Concurrently with the recovery and drying of the wet silicon swarf 909 as above, the after-swarf-removal waste liquid L1 is generated in the inside space of the frame 141 supporting each cathode plate 140 in the water tank 13 depicted in FIG. 1. The after-swarf-removal waste liquid L1 is then fed by the discharge section 142 to the tank 50 of the hydrogen production unit 5 depicted in FIG. 3.

When the after-swarf-removal waste liquid L1 is reserved in the tank 50, a current flows from the direct-current power source 54 to the positive electrode 51, whereas, at the negative electrode 52, a water molecule present near the negative electrode 52 is decomposed into a hydrogen ion and a hydroxide ion, and the hydrogen ion positively charged receives an electron to become a hydrogen atom. Then, two hydrogen atoms are bonded to each other to become one hydrogen molecule, which is generated as gas on the upper part of the inside of the tank 50. Meanwhile, at the positive electrode 51, the hydroxide ion negatively charged gives an electron to the positive electrode 51, so that a water molecule and an oxygen molecule are generated. Then, the hydrogen ($H_2$) gas generated on the negative electrode 52 side with respect to the partition plate 506 in the upper part of the inside of the tank 50 is sent to the fuel cell apparatus 3 through the exhaust pipe 503.

For example, the after-swarf-removal waste liquid L1 in the tank 50 is not only used for production of hydrogen by the electrolysis. Part thereof is sent from the tank 50 to a filter unit including, for example, a CC Filter made by DISCO Corporation, and after the fine silicon swarf 909 is further filtered with a tubular filter paper of the CC Filter, the liquid may be discharged as fresh water from the filter unit.

Figure 6:
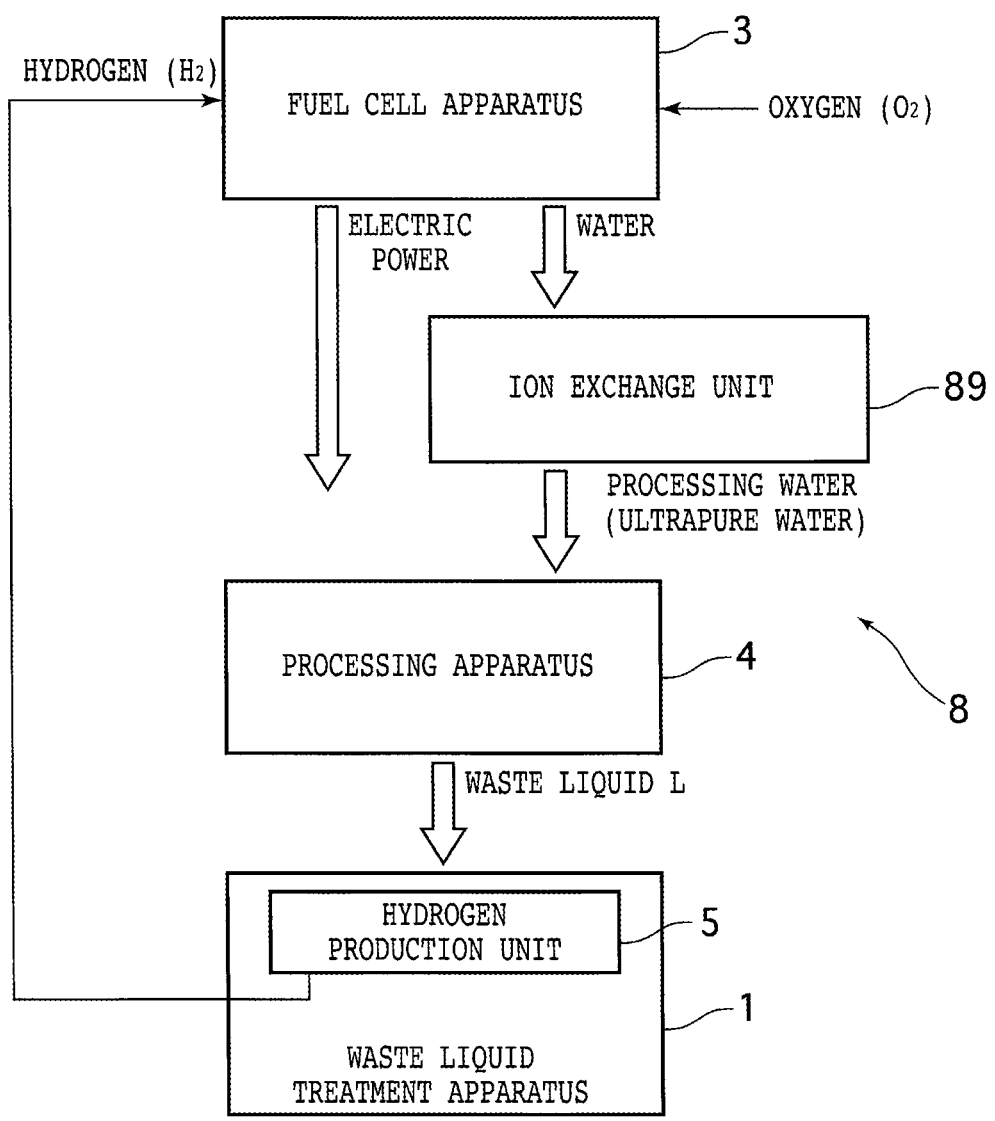
FIG. 6 is a schematic diagram depicting flows of waste liquid, hydrogen gas, water, and electric power in the processing water regeneration equipment.

The fresh water discharged from the filter unit is sent, for example, to an ultraviolet irradiation unit. The ultraviolet irradiation unit irradiates the fresh water flowing therein with ultraviolet rays of a predetermined wavelength from an ultraviolet lamp or the like not illustrated, to thereby decompose (ionize) organic matters and inorganic matters in the fresh water. The fresh water having passed through the ultraviolet irradiation unit is sent, for example, to an ion exchange unit 89 depicted in FIG. 6. The ion exchange unit 89 has a casing filled with both anion exchange resin and cation exchange resin in predetermined proportions. The fresh water is deprived of organic ions and inorganic ions in the ion exchange unit 89, and carbon dioxide gas and the like contained therein are adsorbed on the anion exchange resin, so that the fresh water is turned into neutral ultrapure water (processing water).

The neutral processing water thus obtained from the fresh water through removal of ions and purification may contain fine substances such as resin fragments of the ion exchange resin constituting the ion exchange unit 89. Therefore, the processing water sent from the ion exchange unit 89 may be introduced into a precision filter, and the fine substances such as resin fragments of the ion exchange resin mixed in the processing water may be captured by the precision filter.

The processing water having passed through the precision filter is, for example, after measurement of specific resistance, adjusted to a predetermined temperature, before being supplied to a processing water supply section (not illustrated) of the grinding apparatus 4 depicted in FIG. 1.

The hydrogen generated in the tank 50 depicted in FIG. 3 and the hydrogen generated in the drying box 20 depicted in FIG. 1 pass through the ventilation grooves 340 of the separator 34 on the hydrogen electrode 32 side of the fuel cell apparatus 3 depicted in FIGS. 4 and 5. On the hydrogen electrode 32, an oxidation reaction occurs in which hydrogen is separated into a hydrogen ion and an electron by a catalyst such as platinum. In other words, $2H_2 \rightarrow 4H^+ + 4e^-$ occurs. The hydrogen ion passes through the electrolyte film 30 to move to the oxygen electrode 31 as an opposite pole, whereas the electron passes through an external circuit 36 depicted in FIG. 5 to flow to the oxygen electrode 31 on the opposite side, so that electric power is generated.

In addition, on the oxygen electrode 31, a reduction reaction in which the oxygen molecule taken in from air receives electrons having flowed from the external circuit 36 occurs, resulting in the formation of oxygen ion. Then, the oxygen ion is coupled with the hydrogen ion having moved through the electrolyte film 30, to be water ($H_2O$), which is discharged from the fuel cell apparatus 3 as depicted in FIG. 5. In other words, $O_2 + 4H^+ + 4e^- \rightarrow 2H_2O$ occurs.

The electricity generated in the fuel cell apparatus 3 is utilized by the grinding apparatus 4 depicted in FIG. 1 which is electrically connected to the fuel cell apparatus 3 through the external circuit 36. In addition, the water discharged from the fuel cell apparatus 3 is sent, for example, to the ion exchange unit 89 described above with reference to FIG. 6, to be purified into ultrapure water, before being sent to the grinding apparatus 4 to be utilized as the processing water in the grinding apparatus 4.

As described above, the processing water regeneration equipment 8 according to the present invention includes the hydrogen production unit 5 which is included in the waste liquid treatment apparatus 1 and in which hydrogen is produced by supplying electric power to the positive electrode 51 and the negative electrode 52 in the tank 50, and a chemical reaction is caused between the hydrogen produced by the hydrogen production unit 5 and the oxygen in the air to produce electricity and water by the fuel cell apparatus 3, the electricity and the water being utilizable by the grinding apparatus 4. Accordingly, consumption of electric power and water can be suppressed.

In addition, in the processing water regeneration equipment 8 according to the present invention, the grinding apparatus 4 discharges the waste liquid L containing the silicon swarf 909 obtained by grinding the workpiece 90 made of silicon, and the waste liquid treatment apparatus 1 includes the swarf acquisition unit 11 which takes out the silicon swarf 909 from the waste liquid L to acquire the wet silicon swarf 909, and the drying unit 2 which dries the wet silicon swarf 909. Therefore, the hydrogen generated when the silicon swarf 909 gets dried can be supplied to the fuel cell apparatus 3, so that the hydrogen generated can effectively be utilized, and consumption of electric power and water can further be suppressed.

It is obvious that the processing water regeneration equipment 8 according to the present invention is not limited to the present embodiment and may be implemented in various modes within the scope of the technical thought of the invention. In addition, the step of treating the waste liquid L, the step of drying the silicon swarf 909, and the like can also be modified as required within such ranges that the advantageous effects of the present invention can be exhibited.

For example, the hydrogen production unit 5 depicted in FIG. 3 is installed underground of the plant in which the waste liquid treatment apparatus 1 is installed. In addition, the fuel cell apparatus 3 depicted in FIGS. 4 and 5 is installed, for example, on the roof floor of the plant. Since the hydrogen production unit 5 transports the produced hydrogen as gas to the fuel cell apparatus 3 on the roof floor, transportation cost for the hydrogen gas can be suppressed. Besides, since the water produced by the fuel cell apparatus 3 on the roof floor is transported (flows down) to the grinding apparatus 4 in plant facilities located at a lower position, the transportation cost for water can be suppressed.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. Processing water regeneration equipment comprising:
    a waste liquid treatment apparatus that treats waste liquid discharged from a processing apparatus for processing a workpiece by use of processing water;
    wherein the waste liquid treatment apparatus includes:
        a first positive electrode and a first negative electrode disposed in a first the containing the waste liquid discharged from the processing apparatus, the first positive electrode and the first negative electrode for reserving the waste liquid, and
        a hydrogen production unit in which electric power is supplied to a second positive electrode and a second negative electrode to produce hydrogen from the waste liquid comprising used processing water; and
    a fuel cell apparatus that causes a chemical reaction between the hydrogen produced by the hydrogen production unit and oxygen in air to produce electricity and water, and the electricity and water thus produced are utilized in the processing apparatus.

2. The processing water regeneration equipment according to claim 1,
    wherein the workpiece is made of silicon, and the processing apparatus discharges the waste liquid containing silicon swarf obtained by grinding the silicon,
    the waste liquid treatment apparatus includes
        a swarf acquisition unit that takes out the silicon swarf from the waste liquid to acquire the wet silicon swarf, and
        a drying unit that dries the wet silicon swarf, and
    hydrogen generated when the silicon swarf is dried by the drying unit is supplied to the fuel cell apparatus.

3. The processing water regeneration equipment according to claim 1, wherein the waste liquid discharged from a processing apparatus comprises used processing water and swarf; and the processing water regeneration equipment further comprises a waste liquid treatment apparatus comprising:
    the first tank containing the waste liquid discharged from the processing apparatus comprising used processing water and swarf,
    the first positive electrode and the first negative electrode disposed in the first tank for reserving the waste liquid wherein swarf is removed from the waste liquid,
    wherein the hydrogen production unit comprises a second tank in which after-swarf-removal waste liquid is received from the first tank and in which the second positive electrode and the second negative electrode are located.

4. The processing water regeneration equipment according to claim 3,
    wherein the workpiece is silicon wafer or a silicon ingot;
    wherein the swarf is silicon swarf; and
    wherein the processing apparatus is a grinding apparatus which grinds the workpiece using processing water, wherein silicon swarf becomes mixed with the processing water to form the waste liquid.

5. The processing water regeneration equipment according to claim 3,
    wherein the workpiece is silicon wafer or a silicon ingot;
    wherein the swarf is silicon swarf; and
    wherein the processing apparatus is a cutting apparatus or polishing apparatus which processes the workpiece using processing water, wherein silicon swarf becomes mixed with the processing water to form the waste liquid.

6. The processing water regeneration equipment according to claim 3, wherein the first positive electrode and the first negative electrode are formed of a material which is electrochemically noble.

7. The processing water regeneration equipment according to claim 6, wherein the first positive electrode and the first negative electrode are formed of copper, silver, platinum, or gold, or stainless steel.

8. The processing water regeneration equipment according to claim 3, further comprising a pipe for supplying hydrogen generated when the silicon swarf is dried by the drying unit to the fuel cell apparatus.

9. The processing water regeneration equipment according to claim 3, wherein the second positive electrode and the second negative electrode are formed of a material which is electrochemically noble.

10. The processing water regeneration equipment according to claim 1, wherein the fuel cell apparatus is disposed at a position higher than the hydrogen production unit, the fuel cell is communicatively coupled to the hydrogen production unit, and wherein hydrogen produced by the hydrogen production unit is received by the fuel cell.

11. The processing water regeneration equipment according to claim 10, wherein the fuel cell apparatus is disposed at a position higher than the processing apparatus and the fuel cell apparatus is communicatively coupled to the processing apparatus wherein water produced by the fuel cell apparatus is delivered to the processing apparatus.

12. The processing water regeneration equipment according to claim 1, wherein the fuel cell apparatus is disposed at a position higher than the processing apparatus and the fuel cell apparatus is communicatively coupled to the processing apparatus wherein water produced by the fuel cell apparatus is delivered to the processing apparatus.

13. Processing water regeneration system comprising:
- a processing apparatus for processing a workpiece by use of processing water, the processing water having been used by the processor apparatus being waste liquid, wherein the waste liquid discharged from a processing apparatus comprises used processing water and silicon swarf;
- a silicon swarf dryer that dries the wet silicon swarf;
- a pipe for delivering waste liquid to a waste liquid treatment apparatus that treats the waste liquid discharged from the processing apparatus, the waste liquid treatment apparatus comprising:
  - a first positive electrode and a first negative electrode disposed in a first tank containing the waste liquid discharged from the processing apparatus, the first positive electrode and the first negative electrode for reserving the waste liquid;
  - means for removing silicon swarf from the waste liquid and delivering removed wet silicon swarf to the silicon swarf dryer;
- a pipe for delivering after-swarf-removal waste liquid from the first tank to a hydrogen production unit comprising a second positive electrode and a second negative electrode, wherein electric power is supplied to the second positive electrode and the second negative electrode to produce hydrogen from the after-swarf-removal waste liquid comprising used processing water; and
- a pipe for delivering hydrogen generated by the hydrogen production unit to a fuel cell that causes a chemical reaction between the hydrogen produced by the hydrogen production unit and oxygen in air to produce electricity and water, and the electricity and water thus produced are utilized in the processing apparatus.

14. The processing water regeneration system according to claim 13,
wherein the workpiece is made of silicon,
wherein the silicon swart dryer is communicatively coupled to the fuel cell, wherein hydrogen generated when the silicon swarf is dried by the silicon swarf dryer is supplied to the fuel cell apparatus.

15. The processing water regeneration system according to claim 13, wherein oxygen generated by the hydrogen production unit is supplied to the fuel cell.

16. The processing water regeneration system according to claim 13, wherein the fuel cell is disposed at a position higher than the hydrogen production unit, the fuel cell is communicatively coupled to the hydrogen production unit, and wherein hydrogen produced by the hydrogen production unit is received by the fuel cell.

17. The processing water regeneration system according to claim 16, wherein the fuel cell is disposed at a position higher than the processing apparatus and the fuel cell is communicatively coupled to the processing apparatus wherein water produced by the fuel cell is delivered to the processing apparatus.

18. The processing water regeneration system according to claim 13, wherein the fuel cell is disposed at a position higher than the processing apparatus and the fuel cell is communicatively coupled to the processing apparatus wherein water produced by the fuel cell is delivered to the processing apparatus.

19. Processing water regeneration system comprising:
- a processing apparatus for processing a workpiece by use of processing water, the processing water having been used by the processor apparatus being waste liquid, wherein the waste liquid discharged from a processing apparatus comprises used processing water and silicon swarf;
- a silicon swarf dryer that dries the wet silicon swarf;
- a waste liquid treatment apparatus communicatively coupled to the processing apparatus and receiving and treating the waste liquid discharged from the processing apparatus, the waste liquid treatment apparatus comprising:
  - a first positive electrode and a first negative electrode disposed in a first tank containing the waste liquid discharged from the processing apparatus, the first positive electrode and the first negative electrode for reserving the waste liquid;
  - means for removing silicon swarf from the waste liquid and delivering removed wet silicon swarf to the silicon swarf dryer;
- a hydrogen production unit communicatively coupled to the first tank, the hydrogen production unit comprising a second positive electrode and a second negative electrode, wherein electric power is supplied to the second positive electrode and the second negative electrode to produce hydrogen from the after-swarf-removal waste liquid comprising used processing water; and
- a fuel cell communicatively coupled to the hydrogen production unit and receiving hydrogen generated by the hydrogen production unit, the fuel cell causes a chemical reaction between the hydrogen produced by the hydrogen production unit and oxygen in air to produce electricity and water, and the electricity and water thus produced are utilized in the processing apparatus.

20. The processing water regeneration system according to claim 19, wherein the fuel cell is disposed at a position higher than the hydrogen production unit, the fuel cell is communicatively coupled to the hydrogen production unit, and wherein hydrogen produced by the hydrogen production unit is received by the fuel cell and,
wherein the fuel cell is disposed at a position higher than the processing apparatus and the fuel cell is communicatively coupled to the processing apparatus wherein water produced by the fuel cell is delivered to the processing apparatus.

\* \* \* \* \*